(12) United States Patent
Frederiksen, Jr. et al.

(10) Patent No.: US 7,349,637 B1
(45) Date of Patent: *Mar. 25, 2008

(54) OPTICAL TRANSMITTER WITH SBS SUPPRESSION

(75) Inventors: Thomas R. Frederiksen, Jr., Hatboro, PA (US); Stephen B. Krasulick, Fogelsville, PA (US)

(73) Assignee: Optium Corporation, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/566,118

(22) Filed: Dec. 1, 2006

Related U.S. Application Data (63) Continuation of application No. 10/248,710, filed on Feb. 11, 2003, now Pat. No. 7,146,110.

(51) Int. Cl.
*H04B 10/02* (2006.01)

(52) U.S. Cl. ............... 398/194; 398/193; 398/198

(58) Field of Classification Search ........ 398/182–183, 398/186, 192–194, 198
See application file for complete search history.

(56) References Cited

U.S. PATENT DOCUMENTS

| | | | |
|---|---|---|---|
| 3,854,102 A | 12/1974 | Seipel et al. | |
| 4,560,246 A | 12/1985 | Cotter | |
| 4,573,157 A | 2/1986 | O'Meara | |
| 4,699,452 A | 10/1987 | Mollenauer et al. | |
| 4,723,247 A | 2/1988 | Bhowmik et al. | |
| 4,802,176 A | 1/1989 | O'Meara | |
| 4,964,109 A | 10/1990 | Yoshioka | |
| 5,166,821 A | 11/1992 | Huber | |
| 5,200,964 A | 4/1993 | Huber | |
| 5,204,640 A | 4/1993 | Logan, Jr. | |
| 5,329,396 A | 7/1994 | Fishman et al. | |
| 5,359,450 A | 10/1994 | Ramachandran et al. | |
| 5,420,868 A | 5/1995 | Chraplyvy et al. | |
| 5,473,625 A | 12/1995 | Hansen et al. | |
| 5,513,029 A | 4/1996 | Roberts | |

(Continued)

FOREIGN PATENT DOCUMENTS

EP    0 595 536 A1    5/1994

(Continued)

OTHER PUBLICATIONS

Brown, D.C.; et al., Thermal, Stress, and Thermo-Optic Effects In High Average Power Double-Clad Silica Fiber Lasers, IEEE Journal of Quantum Electronics, Feb. 2001, pp. 207-217, vol. 37, No. 2.

(Continued)

*Primary Examiner*—Leslie Pascal
(74) *Attorney, Agent, or Firm*—Kurt Rauschenbach; Rauschenbach Patent Law Group, LLC (57) ABSTRACT

An optical transmitter and methods of generating an optical signal having SBS suppression are described. An optical transmitter having SBS suppression according to the present invention includes a signal generator that generates a SBS suppression signal. A laser generates a line width broadened optical signal having AM noise. A signal processor generates a modified SBS suppression signal from the SBS suppression signal. A modulator modulates the line width broadened optical signal having the AM noise with a payload modulation signal and with the modified SBS suppression signal to generate a payload modulated optical signal having SBS suppression and reduced AM noise.

20 Claims, 7 Drawing Sheets

U.S. PATENT DOCUMENTS

| | | | |
|---|---|---|---|
| 5,515,196 | A | 5/1996 | Kitajima et al. |
| 5,550,667 | A | 8/1996 | Krimmel et al. |
| 5,566,381 | A | 10/1996 | Korotky |
| 5,671,075 | A | 9/1997 | Ramachandran et al. |
| 5,828,477 | A | 10/1998 | Nilsson et al. |
| 5,838,475 | A | 11/1998 | Takeyari et al. |
| 5,892,607 | A | 4/1999 | Atlas |
| 5,900,959 | A | 5/1999 | Noda et al. |
| 5,907,420 | A | 5/1999 | Chraplyvy et al. |
| 5,910,852 | A | 6/1999 | Fontana et al. |
| 5,917,179 | A | 6/1999 | Yao |
| 5,923,462 | A | 7/1999 | Van Der Plaats |
| 5,930,024 | A | 7/1999 | Atlas |
| 5,953,139 | A | 9/1999 | Nemecek et al. |
| 5,991,061 | A | 11/1999 | Adams et al. |
| 6,072,618 | A | 6/2000 | Takenaka |
| 6,081,361 | A | 6/2000 | Adams et al. |
| 6,166,837 | A | 12/2000 | Adams et al. |
| 6,175,672 | B1 | 1/2001 | Newberg et al. |
| 6,204,951 | B1 | 3/2001 | Coward et al. |
| 6,226,424 | B1 | 5/2001 | Ball et al. |
| 6,282,003 | B1 | 8/2001 | Logan, Jr. et al. |
| 6,331,908 | B1 | 12/2001 | Adams et al. |
| 6,414,772 | B2 | 7/2002 | Miyazaki |
| 6,417,956 | B1 | 7/2002 | Pedersen |
| 6,490,071 | B2 | 12/2002 | Logan, Jr. et al. |
| 6,678,294 | B1 | 1/2004 | Komine et al. |
| 6,689,416 | B2 | 2/2004 | Delzer et al. |
| 6,717,719 | B1 | 4/2004 | Moore |
| 6,832,905 | B2 | 12/2004 | Delzer et al. |
| 7,146,110 | B2 * | 12/2006 | Frederiksen et al. ........ 398/194 |
| 2003/0076567 | A1 | 4/2003 | Matthews et al. |

FOREIGN PATENT DOCUMENTS

| | | |
|---|---|---|
| EP | 0730 190 A2 | 9/1996 |
| EP | 0822 675 A2 | 2/1998 |
| EP | 1306718 A1 | 5/2003 |
| EP | 0804835 B1 | 6/2004 |
| JP | 02152309 A | 12/1990 |
| JP | 7-921510 * | 7/1995 |
| WO | 98/18219 A1 | 4/1998 |
| WO | 00/72451 A2 | 11/2000 |
| WO | 01/50556 A1 | 7/2001 |
| WO | 02/11322 A2 | 2/2002 |
| WO | 2004/073214 A1 | 8/2004 |

OTHER PUBLICATIONS

Coppinger, et al., Dual-Wavelength Transmitter For Ehnanced Video Performance Over A Passive Optical Network, OFC 2003, pp. 734-735, vol. 2, 2003.

Eskidsen, et al., 465km 2 -488 Gbit-s Repeaterlesss Transmission Using A Directly Modulated DFB Laser, OFC 96 Technical Digest, pp. 79-81, 1996.

Harrison, Robert G., et al., Observation And Characterization Of Deterministic Chaos In Stimulated Brillouin Scattering With Weak Feedback, Physical Review, Jan. 1994, pp. R24-R27, vol. 49, No. 1, The American Physical Society.

Harrison, Robert G., et al, SBS Self-Phase Conjugation Of CW Nd:YAG Laser Radiation In An Optical Fibre, Optics Communications, May 15, 1999, pp. 208-211, vol. 163, Elsevier.

Harrison, Robert G., et al., Stimulated Brillouin Scattering, Chapter 0.1, pp. 1-11, Heriot-Watt, 1999.

Imai, Y, et al., Dependence Of Stimulated Brillouin Scattering On Temperature Distribution In Polarization-Maintaining Fibers, IEEE Photonics Technlogy Letters, Nov. 1993, pp. 1335-1337, vol. 5, No. 11.

Ippen, E.P., Nonlinear Effects in Optical Fibers, Laser Applications to Optics And Spectroscopy; Based on Lectures of the Jul. 8-20, 1973, 1975, pp. 213-244, vol. 6.

Ippen, E.P., et al., Stimulated Brillouin Scattering In Optic Fibers, Dec. 1972, pp. 539-540, vol. 21, No. 11, American Institute of Physics.

Jeong, Y., et al., Single-Frequency, Polarized Ytterbium-Doped Fiber MOPA Source With 264 W. Output Power, Conference On Cases and Electro-Optics (CLEO), May 17-19, 2004.

Jez, D.R., Suppression Of Stimulated Brillouin Scattering In Analog CATV Transmission Systems, The University of British Columbia, Feb. 2002.

Kovalev, V.I., et al., Waveguide-Induced Inhomogeneous Spectral Broadening Of Stimulated Brillouin Scattering In Optical Fiber, Optics Letters, Nov. 15, 2002, pp. 2022-, vol. 27, No. 22, Optical Society of America.

Kovalev, V.I., et al., Suppression of Stimulated Brillouin Scattering In High-Power Single-Frequency Fiber Amplifiers, Optic Letters, Jan. 15, 2006, pp. 161-163, vol. 31, No. 2.

Le Floch, et al., Study of Brillouin Gain Spectrum in Standard Single-Mode Optical Fiber At Low Temperatures (1.4-370 K) and High Hydrostatic Pressures (1-250 bars), Optics Communications, 2003, pp. 395-410, vol. 219, Elsevier Science.

Liem, A., et al., 100-W Single -Frequency Master-Oscillator Fiber Power Amplifier, Optics Letters, Sep. 1, 2003, pp. 1537-1539, vol. 28, No. 17, Optical Society Of America.

Mao, X. P., et al., Stimulated Brillouin Threshold Dependence On Fiber Type And Uniformity, IEEE Photonics Technology Letters, Jan. 1992, pp. 66-69, vol. 4, No. 1.

Pilipetskii, A. N., et al., Calculation Of The Threshold And Of The Efficiency Of Conversion By Stimulated Scattering In An Amplifying Medium, Soviet Journal Quantum Electronics, Feb. 1985, pp. 284-286, American Institute Of Physics.

Shimizu, et al., 10 Gbit Repeaterless Transmission Over 258 km Employing 24 ps RZ pulses, OFC '96 Technical Digest, pp. 15-16, 1996.

Tang, C. L., Saturation And Spectral Characteristics Of The Stokes Emission In The Stimulated Brillioun Process, Journal Of Applied Physics, Jul. 1966, pp. 2945-2955, vol. 37, No. 8.

Tsubokawa, M., et al., Suppression Of Stimulated Brillouin Scattering In A Single-Mode Fibre By An Acousto-Optic Modulator, Electronic Letters, Apr. 24, 1986, pp. 473-475, vol. 22, No. 9.

Wang, Y., et al., Thermal Effects In Kilowatt Fiber Lasers, IEEE Photonics Technology Letters, Jan. 2004, pp. 63-, vol. 16, No. 1, IEEE.

Wilson, et al., SBS And MPI Suppression In Analogue System With Integrated Electroabsorption Modulator—DFB Laser Transmitters, Electronic Letters, Aug. 1, 1996, vol. 32, No. 16.

Zawischa, I., All-Solid-State Neodymium-Based Single-Frequency Master-Oscillator Fiber Power-Amplifier System Emitting 5.5 W Of Radiation At 1064 nm, Optics Letters, Apr. 1, 1999, pp. 469-471, vol. 24, No. 7.

Brillouin Scattering, Encyclopedia Of Laser Physics And Technology, 2006.

* cited by examiner

OPTICAL TRANSMITTER WITH SBS SUPPRESSION

RELATED APPLICATION SECTION

This application is a continuation application of U.S. patent application Ser. No. 10/248,710, filed on Feb. 11, 2003, entitled "Optical Transmitter with SBS Suppression," the entire application of which is incorporated herein by reference.

BACKGROUND OF INVENTION

Optical fiber communication systems are lightwave systems that employ optical fibers to transmit information. Optical fiber communications systems include optical transmitters, optical receivers, and transmission media that propagate information between the optical transmitters and the optical receivers. An optical transmitter for an optical fiber communication system includes an optical source, such as a semiconductor laser, that generates an optical signal and an optical modulator that modulates the optical signal with data or voice information. The modulated optical signal is transmitted through a transmission media, such as an optical fiber, to an optical receiver. The optical receiver detects the transmitted optical signal and processes the optical signal into an electronic waveform that contains the data or voice information.

Optical fiber communication systems are now widely deployed. Recently, relatively new communications services, such as the Internet, high-speed data links, video services, wireless services and CATV, have resulted in a dramatic increase in the need for higher information data rates. The aggregate data throughput rate of a communication system can be increased either by increasing the bandwidth of an individual data channel or by increasing the number of data channels.

In addition, many optical fiber communication systems today are being built to transmit data over long distances with high data rates. Moreover, such systems are currently being built to transmit data and voice information over these longer distances without employing repeaters in order to reduce the capital and operating costs associated with transmitting data. In order to achieve these higher data rates and longer transmission distances, optical signals having relatively narrow line widths must be transmitted at relatively high intensity.

The noise detected at the receiver increases as the bandwidth of an individual channel is increased. The amount of optical power in the transmitted carrier signal must be increased to maintain a sufficient signal-to-noise ratio at the receiver as the bandwidth of an individual channel is increased. However, the propagation distance that can be achieved using a carrier signal with increased power in a narrow line width is severely limited by a physical effect known as stimulated Brillouin scattering (SBS).

Stimulated Brillouin scattering is a stimulated scattering process that converts a forward traveling optical wave into a backward traveling optical wave that is shifted in frequency relative to the forward traveling optical wave. Backward scattering occurs within optical fibers because of coupling between acoustic phonons created by vibrational excitation of acoustic modes in the optical fiber material itself and by the incident photons of the optical signal.

The acoustic phonons and photons generate transient gratings that produce backward scattering and frequency shifting of the incident optical signals. The frequency shifting is typically between about 10-100 MHz for commonly used optical communication fibers. Stimulated Brillouin scattering also causes multiple frequency shifts. In addition, SBS can permanently damage the optical fiber if the optical propagating power is sufficiently high.

The transmission quality of optical signals having relatively high intensity and narrow line width can be improved by reducing the effects of SBS. The increase in the transmission quality can allow data and voice service providers to increase the optical signal power level, and therefore, increase the possible propagation distance of their communication links between repeaters. Consequently, reducing the effects of SBS can reduce the cost per bit to transmit data and voice information.

BRIEF DESCRIPTION OF DRAWINGS

This invention is described with particularity in the detailed description. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Optical fibers used for communications exhibit stimulated Brillouin scattering (SBS) at optical signal power levels that are as low as ~1 mW in some optical fibers. The threshold optical power that causes SBS can be expressed by the following equation:

$$I_{th} \cong 21(\alpha/G_B)$$

where the parameter $\alpha$ represents absorption in the optical fiber and the parameter $G_B$ represents the peak gain, which is approximately $5\times10^{-11}$ m/W for narrow-bandwidth signals used for communications. The peak gain decreases as the incident optical signal bandwidth increases. For example, an optical fiber having an effective area of 50 $\mu m^2$, and having an absorption coefficient $\alpha \cong 0.2$ dB/km, will exhibit a threshold optical power level which causes SBS that is approximately 2.4 mW for an optical fiber length that is approximately 20 km.

Optical power levels that exceed the threshold optical power will cause the SBS to rapidly rise until the SBS limits the power that can be transmitted through the optical fiber. When the SBS limits the power that can be transmitted through the optical fiber, the power transmitted forward through the optical fiber will become nearly independent of the power of the incident optical signal.

One method of suppressing SBS in optical fibers is to vary the phase angle of the optical signal with time in order to impose recurrent phase deviations that suppress SBS. Another method of suppressing SBS is to increase the effective optical source line width by using a carrier waveform that has multiple frequencies. For example, a single optical source can be configured to generate two longitudinal optical modes with slightly different wavelengths that produce a beat frequency that increases the effective optical source line width.

Another method of suppressing SBS is to increase the line width of the optical source by modulating the broadened optical signal with a noise source. The noise source can be frequency or phase modulated. The bandwidth of the noise and/or the optical modulation index is controlled to provide a desired line width for the broadened optical signal. For example, one method of suppressing SBS generates white noise and extracts a component of the white noise having a predetermined frequency band. The component of white noise is then superimposed on the bias current of the optical source to widen the line width of the optical source.

Another method of suppressing SBS is to tune the optical source with a dither signal in order to increase the line width of the optical source. For example, one method of suppressing SBS uses a resonant cavity distributed feedback (DFB) laser with an external modulator to superimpose a dither signal onto the optical signal. This method is undesirable because it requires a relatively complex and expensive laser.

These methods of increasing the line width of the optical source can have the undesirable effect of generating residual signals or noise in the frequency band of interest or generating residual signals or noise as intermodulation frequency products. These undesirable residual signals or noise can be reduced or eliminated by applying a dither signal to the laser bias drive signal that has a frequency which is outside of the frequency band of interest. However, modern broadband optical communication systems typically require the use of a microwave frequency dither signal in order to reduce these residual signals or noise. Including such a microwave dither signal generator in the communication system is undesirable because it can significantly increase the overall cost of the system and can also cause undesirable electromagnetic interference.

The methods and apparatus of the present invention suppress SBS in optical fiber transmission systems by increasing the line width of the optical signal and by reducing amplitude modulation (AM) noise. Suppression of stimulated Brillouin scattering is achieved by generating a SBS suppression signal that can be a single coherent dither tone or any combination of signals that increases the optical signal line width, such as noise, pseudorandom noise sequences or other line width increasing techniques. The SBS suppression signal can have a bandwidth that is within or outside the data transmission bandwidth. Reducing the AM noise is achieved by modulating a cancellation signal.

Figure 1:
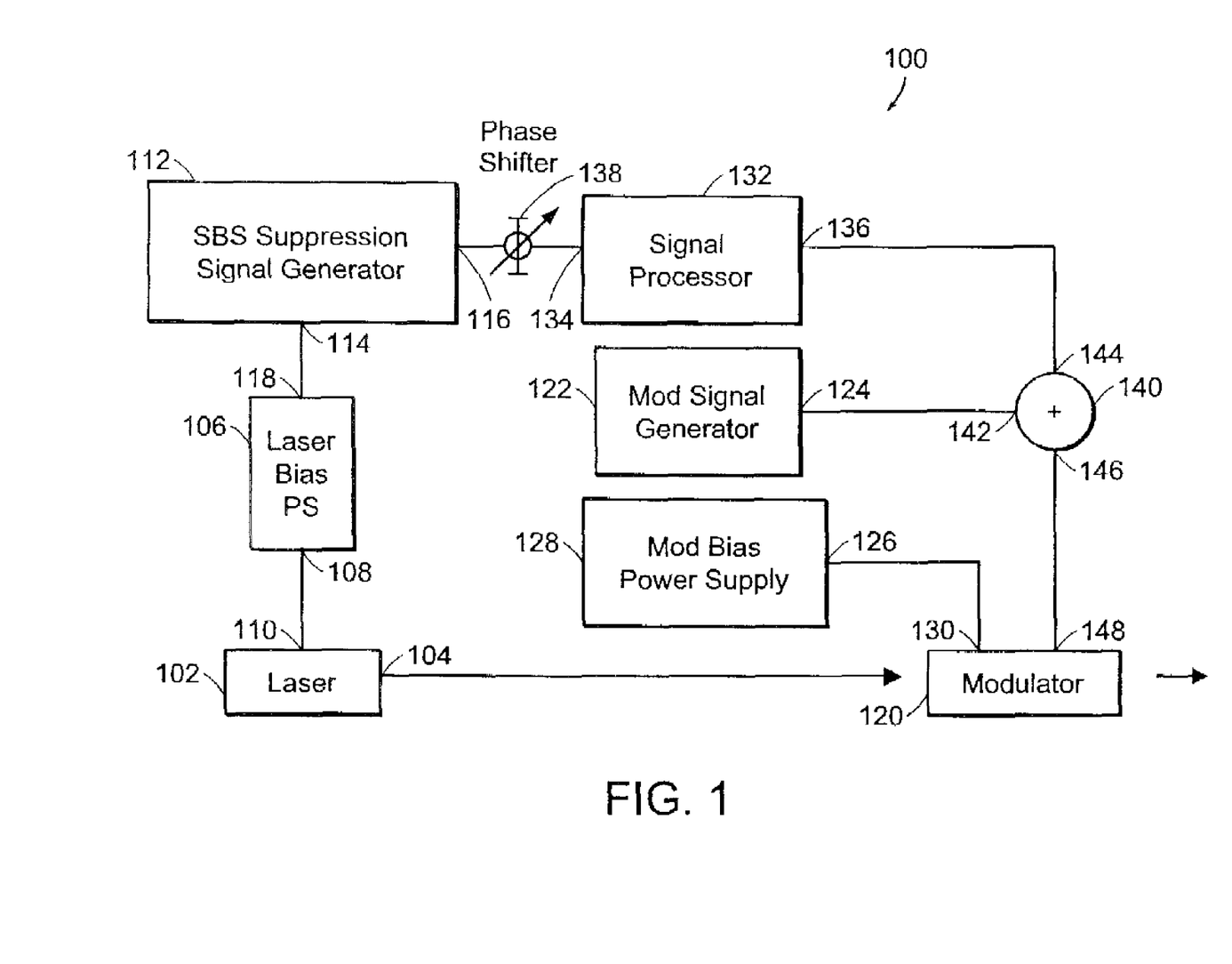
FIG. 1 illustrates a block diagram of an optical transmitter that suppresses SBS by increasing the bandwidth of the optical signal and by reducing amplitude modulation noise according to the present invention.

FIG. 1 illustrates a block diagram of an optical transmitter 100 that suppresses SBS by increasing optical signal bandwidth according to the present invention and by reducing amplitude modulation noise. The term "optical transmitter" is defined herein to mean all devices (sources, modulators, amplifiers and processors) that prepare an optical signal for transmission through a transmission media. The transmitter 100 includes a laser 102 that generates an optical signal at an output 104. The laser 102 can be any type of laser that generates the appropriate optical signal and that is responsive to an electrical bias control signal.

The optical transmitter 100 includes a laser bias power supply 106 having an output 108 that is electrically coupled to a bias input 110 of the laser 102. The laser bias power supply 106 generates a bias signal at the output 108 that biases the laser 102 at the appropriate operating point so that it emits the optical signal at the desired wavelength and at the desired power level. In one embodiment, a detector (not shown) monitors the laser 102 and generates a feedback signal that is used to change the bias signal that is generated by the laser bias power supply 106 in order to control the wavelength and/or power of the optical signal that is generated by the laser 102.

The optical transmitter 100 also includes a SBS suppression signal generator 112 that generates a SBS suppression signal at a first 114 and a second output 116. The SBS suppression signal generator 112 generates a signal that broadens the line width of the optical signal that is generated by the laser 102. The SBS suppression signal generator according to the present invention can generate any type of signal that broadens the line width of an optical signal. There are numerous types of signals that are known to broaden the line width of an optical signal. For example, the SBS suppression signal can comprise a wide range of frequency spectra that can include random noise, pseudo random noise, and discrete tones.

The SBS suppression signal generator 112 can be any type of signal generator that generates a signal that broadens the line width of the optical signal that is generated by the laser 102. For example, the SBS suppression signal generator 112 can include a random noise source, a deterministic noise source, such as a pseudorandom sequence source, a dither signal generator, or a coherent signal sources. In one embodiment, the SBS suppression signal generator 112 includes a filter (not shown) that limits the bandwidth of the SBS suppression signal. In one embodiment, the SBS suppression signal generator 112 includes a modulator (not shown) that generates a modulation signal that broadens the line width of the optical signal. An exemplarily embodiment of the SBS suppression signal generator 112 is described in connection with FIG. 2.

The first output 114 of the SBS suppression signal generator 112 is electrically connected to an input 118 of the laser bias power supply 106. The transmitter 100 also includes an optical modulator 120 that is optically coupled to the output 104 of the laser 102. The optical modulator 120 modulates the optical signal that is generated by the laser 102. The present invention is described with embodiments that use external modulation. However, the present invention can be practiced with any type of modulation.

The optical modulator 120 can be any type of optical modulator that is responsive to an electrical modulation signal. In one embodiment, the optical modulator 120 is an electro-absorption modulator. In another embodiment, the optical modulator 120 is a Mach Zehnder-type interferometric modulator. In still another embodiment, the optical modulator 120 is an optical gain modulator, such as a semiconductor optical amplifier (SOA) or other gain modulating device.

A modulation signal generator 122 generates a payload modulation signal at an output 124. In some embodiments, the modulation signal generator 122 also generates a DC bias offset voltage that biases the optical modulator 120 at the appropriate operating point. In the embodiment illustrated in FIG. 1, an output 126 of a separate DC bias voltage power supply 128 is electrically coupled to a bias input 130 of the optical modulator 120.

The optical transmitter 100 also includes a signal processor 132 that has an input 134 that is electrically coupled to the output 116 of the SBS suppression signal generator 112. The signal processor 132 processes the SBS suppression signal that is generated by the SBS suppression signal generator 112 and produces a modified SBS suppression signal at an output 136. The modified SBS suppression signal is a signal that is used to reduce or suppress amplitude modulation (AM) noise caused by the SBS suppression signal that is used to spread the line width of the optical signal generated by the laser 102. The modified SBS suppression signal, however, maintains the desired line spreading in the optical signal. The term "AM noise" is defined herein to mean undesirable amplitude modulation or residual signals.

Figure 3:
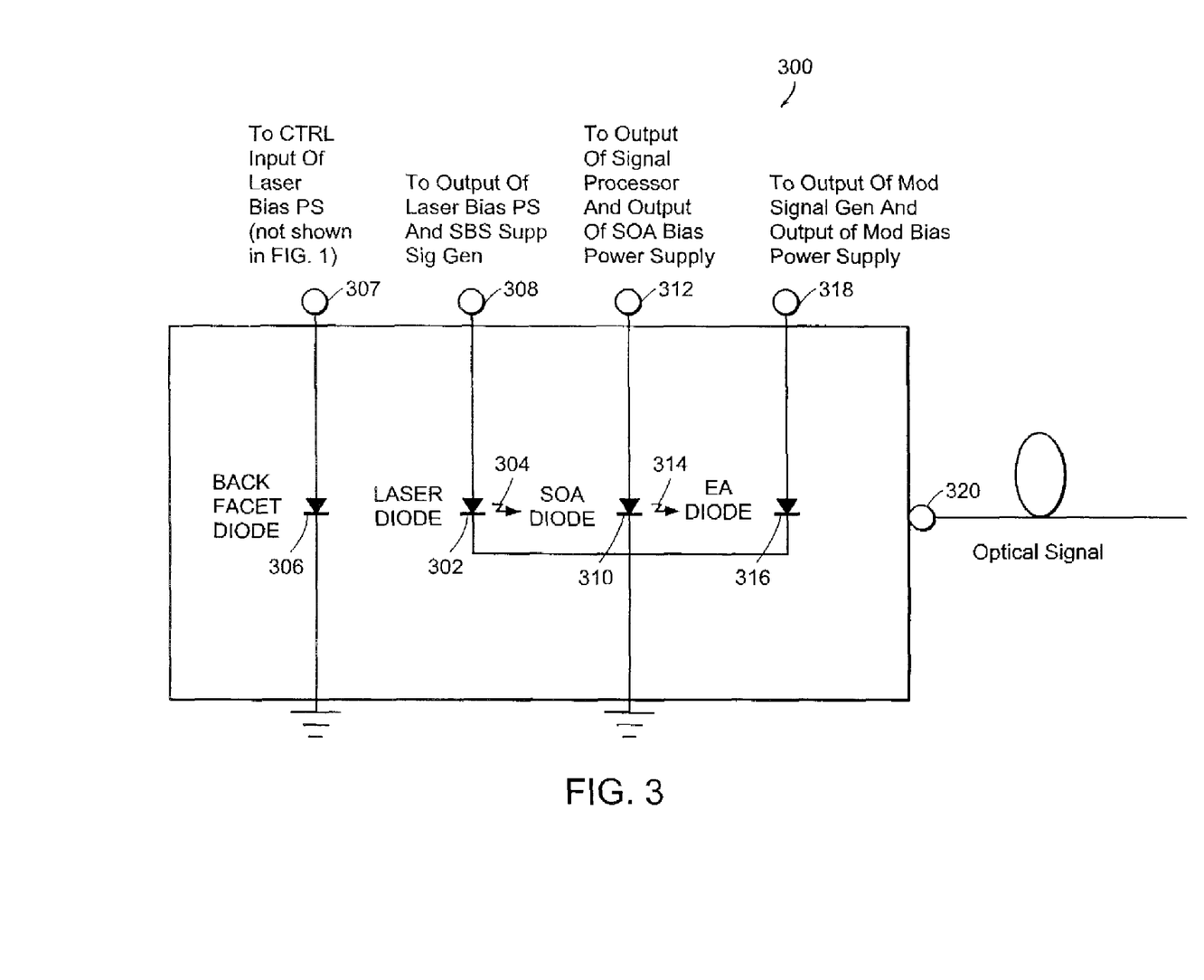
FIG. 3 illustrates an embodiment of an integrated optical transmitter subassembly that can be used to generate an optical signal with SBS suppression according to the present invention.

A summation circuit 140 is used to combine the payload modulation signal that is generated by the modulation signal generator 122 with the modified SBS suppression signal that is generated by the signal processor 132. In the embodiment shown in FIG. 1, the output 124 of the modulation signal generator 122 is electrically coupled to a first input 142 of the summation circuit 140. The output 136 of the signal processor 132 is electrically coupled to a second input 144 of the summation circuit 140. An output 146 of the summation circuit 140 is electrically coupled to an input 148 of the modulator 120. In some embodiments (not shown), the processed SBS suppression signal and the payload modulation signal are electrically coupled to different inputs (not shown) of the optical modulator 120. In other embodiments, the processed SBS suppression signal and the payload modulation signal are electrically coupled to separate gain or loss elements as shown in FIG. 3.

In operation, the laser bias power supply 106 generates a laser bias signal that is sufficient to cause the laser 102 to generate the optical signal with the desired wavelength and power level. The SBS suppression signal generator 112 generates a SBS suppression signal that increases the bandwidth of the optical signal that is generated by the laser 102. For example, the SBS suppression signal can be a bandwidth limited noise signal, a discrete tone, or a combination of noise signals and discrete tones. In one embodiment, a phase shifter 138 shifts the phase of the SBS suppression signal.

The laser bias signal is combined with the SBS suppression signal and then the combined signal is coupled to the input 110 of the laser 102. The combined laser bias signal and SBS suppression signal drives the laser 102 to generate an optical signal having increased bandwidth at the output 104.

The signal processor 132 processes the SBS suppression signal and generates a modified SBS suppression signal at the output 136. In one embodiment, the phase shifter 138 applies a phase shift to the SBS suppression signal and the signal processor 132 processes the phase-shifted SBS suppression signal and generates the modified SBS suppression signal at the output 136. In one embodiment, the signal processor 132 shifts the phase of the SBS suppression signal. Phase shifting can be used to achieve vector cancellation that compensates for an imperfect match of the phase response between the optical signal that is generated by the laser 102 and the optical signal modulated by the modulator 120.

In one embodiment, the modified SBS suppression signal has a signal bandwidth that is within the frequency range of the payload modulation signal. In another embodiment, the modified SBS suppression signal has a signal bandwidth that is outside the payload modulation signal bandwidth.

In one embodiment, the modified SBS suppression signal includes a cancellation signal that reduces or substantially cancels AM noise in the optical modulation signal that is caused by the SBS suppression signal. For example, in one embodiment, the modified SBS suppression signal is a complementary SBS suppression signal. In this embodiment, the signal processor 132 generates a modified SBS suppression signal that includes an inverted replica of the SBS suppression signal. The term "replica" is defined herein to mean a substantially exact or approximate copy of the signal that causes approximate vector cancellation of the SBS suppression signal.

In another embodiment, the signal processor 132 generates a modified SBS suppression signal that includes an inverted replica of the SBS suppression signal that is phase shifted relative to the SBS suppression signal that is used to drive the laser 102. In yet another embodiment, the signal processor 132 generates a modified SBS suppression signal that includes an inverted replica of the SBS suppression signal that is scaled in amplitude relative to the SBS suppression signal that is used to drive the laser 102.

In other embodiments, the signal processor 132 generates a modified SBS suppression signal that includes a signal that is a mathematical transform of the SBS suppression signal. In some embodiments, the mathematical transform is chosen to cause vector cancellation of the SBS suppression signal. In other embodiments, the mathematical transform is chosen to produce a pre-distortion that compensates for modulation non-linearities caused by the laser 102 and/or the modulator 120. In yet other embodiments, the signal processor 132 generates a modified SBS suppression signal that includes a signal having a harmonic of the SBS suppression signal.

The summation circuit 140 combines the payload modulation signal with the modified SBS suppression signal and applies the combined signal to the input 148 of the modulator 120. The optical modulator 120 modulates the optical signal that is generated by the laser 102 with the combined signal. The AM noise portion of the SBS suppression signal is reduced or substantially canceled in the resulting modulated optical signal.

Experimental results have been obtained by using a SBS suppression signal generator 112 that includes a thermally generated noise signal. These experimental results indicate that greater than 10 dB of AM noise suppression is achievable for noise that is bandwidth limited to 20 kHz. Experimental results have also been obtained by using a SBS suppression signal generator 112 that includes a discrete electrical tone generator. These experimental results indicate that 20 dB of AM noise suppression is achievable when injecting a single 9 kHz tone. The experimental results show that the AM noise suppression is sufficient to reduce the AM noise detected at an optical receiver to negligible levels for the applied signal power levels that are required to produce the desired frequency spreading.

Figure 2:
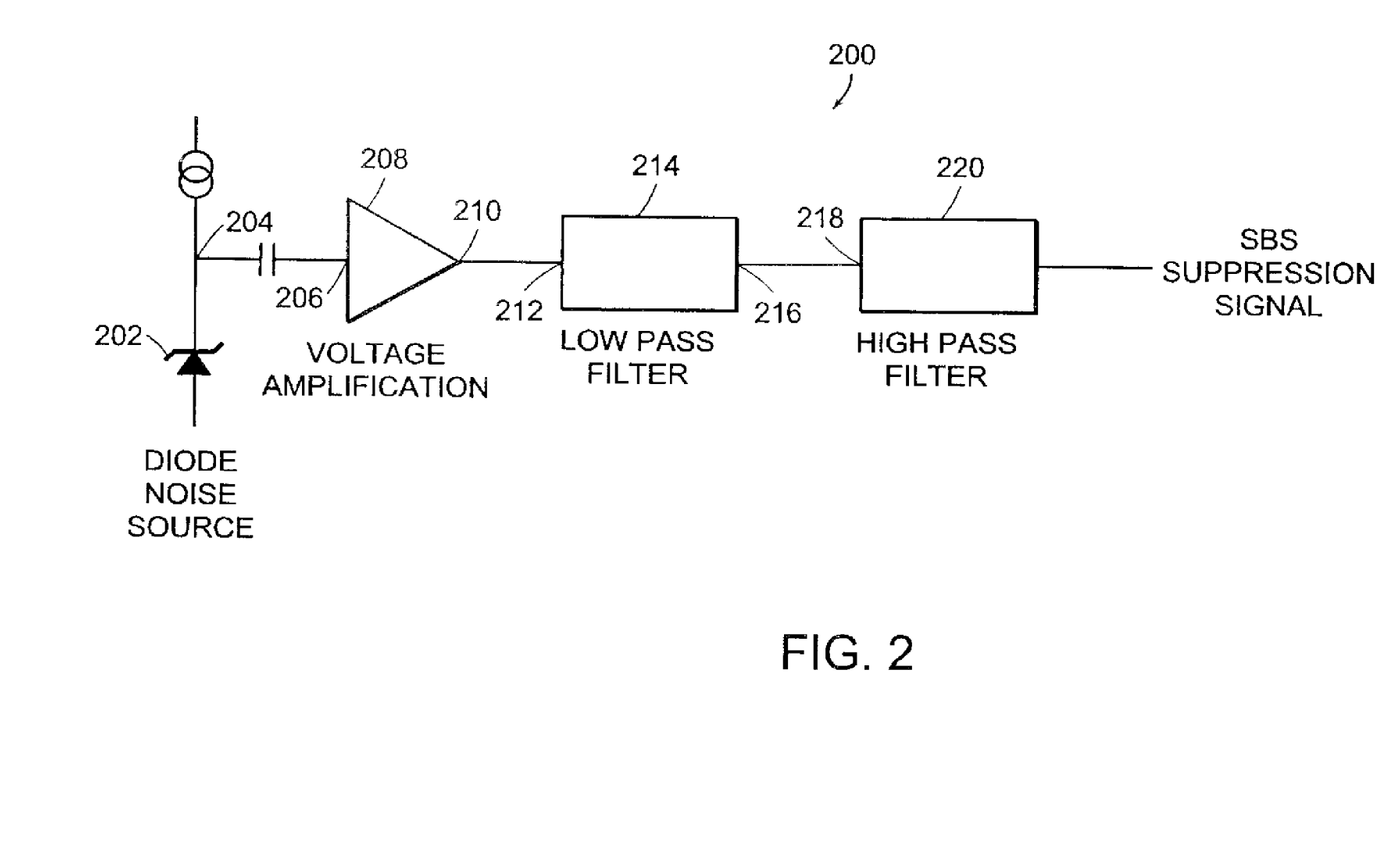
FIG. 2 illustrates a block diagram of an embodiment of a SBS suppression signal generator that generates a SBS suppression signal that increases the line width of the optical signal according to the present invention.

FIG. 2 illustrates a block diagram of an embodiment of a SBS suppression signal generator 200 that generates a SBS suppression signal that increases the line width of the optical signal according to the present invention. The SBS suppression signal generator 200 includes a noise source 202 that generates a noise signal at an output 204. In the embodiment shown, the noise source 202 is a Zener diode noise source. However, numerous other noise sources can be used. In other embodiments, a signal generator (not shown) is used to generate a single or multi-frequency waveform that is used to produce the SBS suppression signal. In these embodiments, the SBS suppression signal generator 200 can produce waveforms, such as sinusoidal, ramp, or other waveforms that are used to generate the SBS suppression signal.

The output 204 of the noise source 202 is capacitively coupled to an input 206 of a voltage amplifier 208. The voltage amplifier 208 amplifies the noise signal to a signal level that is appropriate for SBS suppression. An output 210 of the voltage amplifier 208 is electrically coupled to an input 212 of a low-pass filter 214. The low-pass filter 214 passes a portion of the noise signal that has frequency components below a certain cut-off frequency of the low-pass filter 214. An output 216 of the low-pass filter 214 is electrically coupled to an input 218 of a high-pass filter 220. The high-pass filter 220 passes a portion of the low-pass filtered noise signal that has frequency components above a cut-off frequency of the high-pass filter 220.

Figure 6:
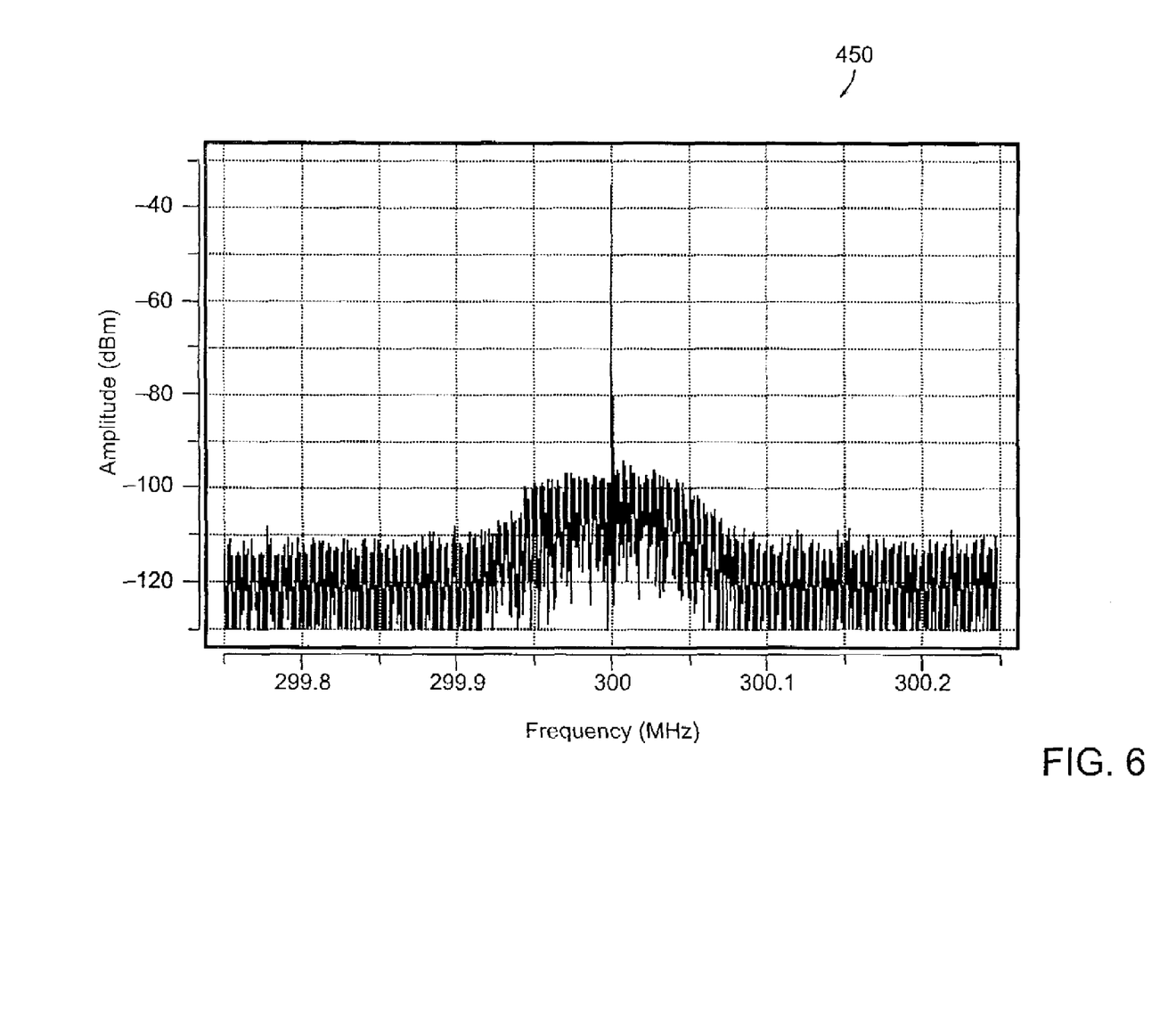
FIG. 6 illustrates a 500 kHz span of a frequency spectra generated by a commercially available CATV receiver that received an optical signal that was generated by an optical transmitter according to the present invention without SBS suppression compensation.
Figure 7:
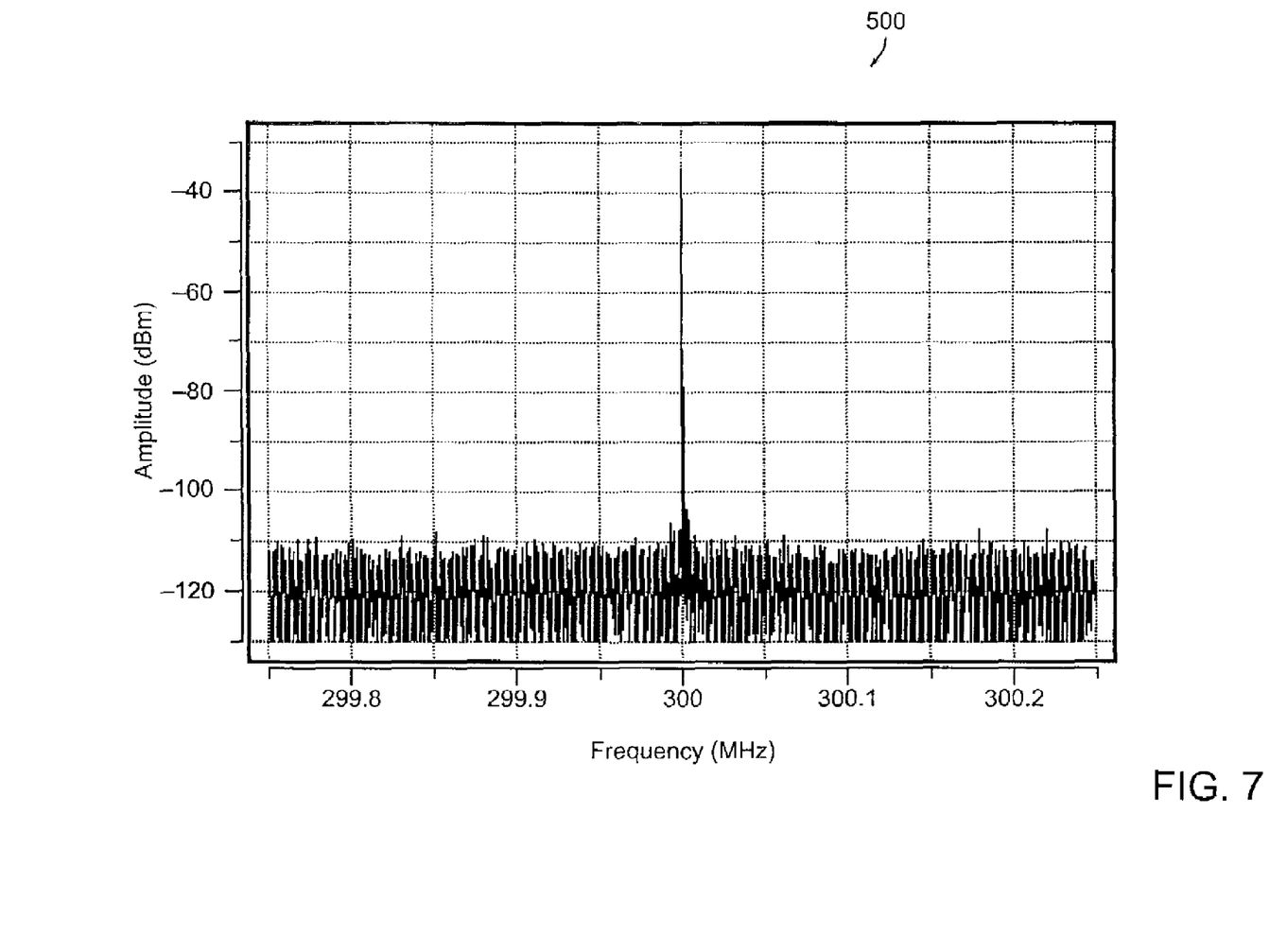
FIG. 7 illustrates a 500 kHz span of a frequency spectra generated by a commercially available CATV receiver that received an optical signal that was generated by an optical transmitter according to the present invention with SBS suppression compensation.

Experimental data are shown in FIGS. 6 and 7 for an embodiment of the SBS suppression signal generator 112 (FIG. 1) where the low pass filter 214 comprises a 50 kHz fourth-order Butterworth filter and the high-pass filter 220 comprises a second-order Butterworth filter that is tuned to 1 kHz.

FIG. 3 shows an embodiment of an integrated optical transmitter subassembly 300 that can be used to generate an optical signal with SBS suppression according to the present invention. In one embodiment, the transmitter subassembly 300 is an opto-electronic integrated circuit. In another embodiment, the transmitter subassembly 300 comprises discrete components.

Referring to FIG. 1 and FIG. 3, the transmitter subassembly 300 includes a laser diode 302 that generates an optical signal at an output 304 with the appropriate wavelength and power level. An input 308 of the laser diode 302 is electrically coupled to the output 108 of the laser bias power supply 106 which is driven by the output 114 of the SBS suppression signal generator 112.

In one embodiment, the transmitter subassembly 300 includes a back facet diode detector 306 that generates a feedback signal at an output 307. The feedback signal can be used to change the bias signal that is generated by the laser bias power supply 106 in order to control the wavelength and/or power of the optical signal that is generated by the laser 302.

The transmitter subassembly 300 also includes a SOA diode 310, such as a Fabry Perot or traveling wave semiconductor amplifier. The SOA diode 310 is optically coupled to the output 304 of the laser diode 302. An input 312 of the SOA diode 310 is electrically coupled to the output 136 of the signal processor 132 and the output of an SOA bias power (not shown in FIG. 1) that is used to bias the SOA diode 310 at the desired operating point. The SOA diode 310 is an in-line optical amplifier that generates an optical signal at an output 314 that is gain modulated by the SBS suppression signal.

The transmitter subassembly 300 also includes an electro-absorption (EA) diode 316 that is optically coupled to the output 314 of the SOA diode 310. An input 318 of the EA diode 316 is electrically coupled to the output 124 of the modulation signal generator 122 and to the output 126 of the modulation bias power supply 128.

The operation of the transmitter subassembly 300 is similar to the operation of the optical transmitter 100 that was described in connection with FIG. 1. Referring to FIG. 1 and FIG. 3, the laser bias power supply 106 generates a laser bias signal that is sufficient to cause the laser diode 302 to generate the optical signal with the desired wavelength and power level. The SBS suppression signal generator 112 generates a SBS suppression signal that increases the bandwidth of the optical signal that is generated by the laser diode 302. The laser bias signal and the SBS suppression signal are applied to the input 308 of the laser diode 302. The laser diode 302 generates an optical signal having increased bandwidth at the output 304.

The signal processor 132 processes the SBS suppression signal and generates a modified SBS suppression signal at the output 136. In one embodiment, the modified SBS suppression signal includes a cancellation signal that reduces or substantially cancels undesirable AM noise in the optical modulation signal that is caused by the SBS suppression signal as described in connection with FIG. 1. The output 136 of the signal processor 132 is applied to the input 312 of the SOA diode 310. A SOA bias power supply (not shown) generates a bias signal that biases the SOA diode 310 at an operating point that produces the desired gain modulation. The bias signal is applied to the input 312 of the SOA diode 310. The SOA diode 310 generates an amplified optical signal at the output 314 that is gain modulated by the modified SBS suppression signal.

The EA diode 316 is biased by the modulation bias signal that is generated at the output 126 of the modulation bias power supply 128. The EA diode 316 modulates the amplified optical signal that is gain modulated by the modified SBS suppression signal with the modulation payload signal that is generated by the modulation signal generator 122. The EA diode 316 generates a payload modulation signal at an output 320.

The payload modulation signal has SBS suppression resulting from the increased line width produced by the SBS suppression signal. The payload modulation signal also has reduced AM noise because the optical signal is gain modulated by the modified SBS suppression signal. In addition, the payload modulation signal has a relatively high signal-to-noise ratio because the full modulation depth of the EA diode 316 is available for the payload.

Figure 4:
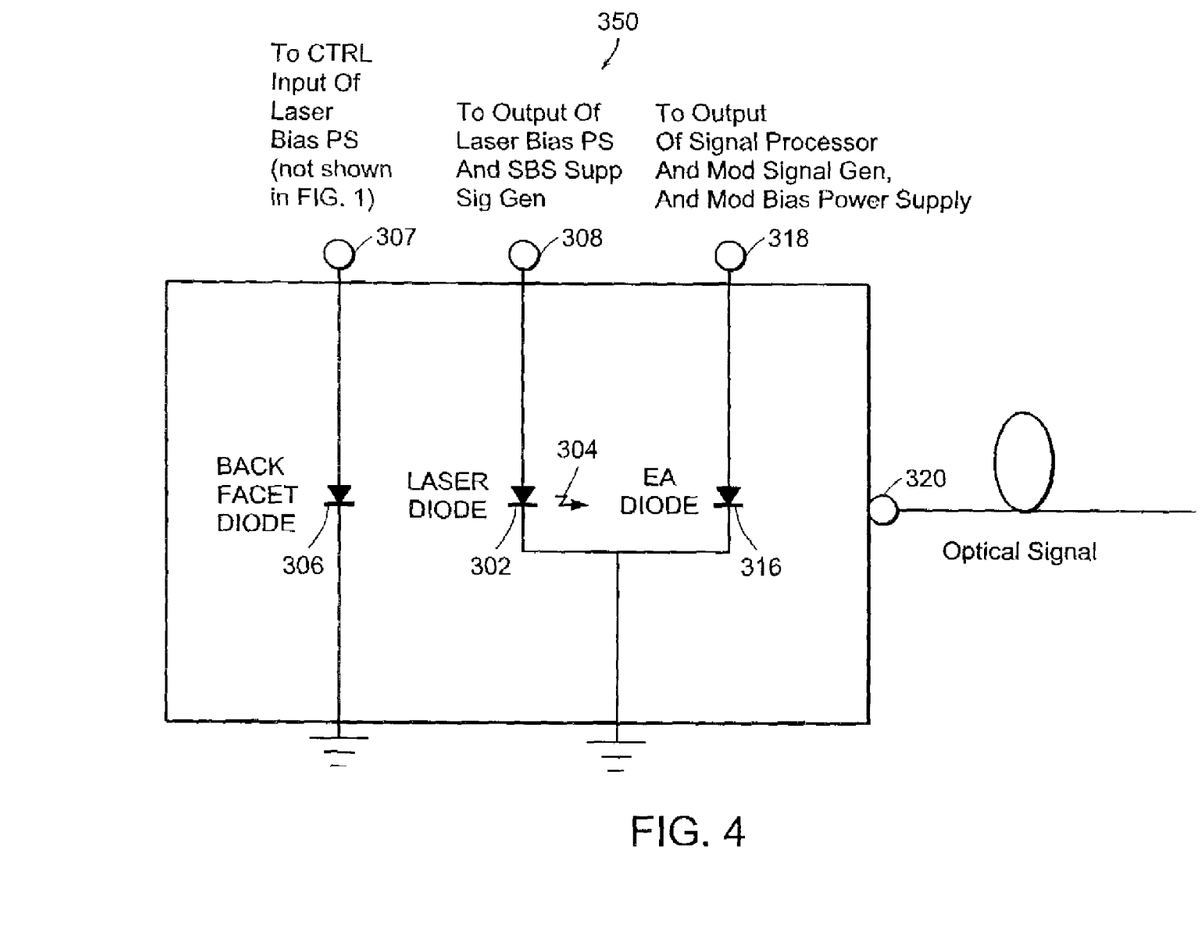
FIG. 4 illustrates another embodiment of an integrated optical transmitter subassembly that can be used to generate an optical signal with SBS suppression according to the present invention.

FIG. 4 illustrates another embodiment of an integrated optical transmitter subassembly 350 that can be used to generate an optical signal with SBS suppression according to the present invention. The integrated optical transmitter subassembly 350 of FIG. 4 can be less expensive to manufacture compared with the integrated optical transmitter subassembly 300 of FIG. 3. The transmitter subassembly 350 is similar to the transmitter subassembly 300 that was described in connection with FIG. 3. However, the optical transmitter subassembly 350 does not include the SOA diode 310 shown in FIG. 3. Instead, the EA diode 316 of the transmitter subassembly 350 is electrically coupled to the output 136 of the signal processor 132 (FIG. 1), the output 124 of the modulation signal generator 122 (FIG. 1), and to the output 126 of the modulation bias power supply 128 (FIG. 1).

The operation of the transmitter subassembly 350 is similar to the operation of the transmitter subassembly 300 that was described in connection with FIG. 3. Referring to FIG. 1, FIG. 3 and FIG. 4, the laser bias power supply 106 generates a laser bias signal that is sufficient to cause the laser diode 302 to generate the optical signal with the desired wavelength and power level. The SBS suppression signal generator 112 generates a SBS suppression signal that increases the bandwidth of the optical signal generated by the laser diode 302. The laser bias signal and the SBS suppression signal are applied to the input 308 of the laser diode 302. The laser diode 302 generates an optical signal having increased bandwidth at the output 304.

The signal processor 132 processes the SBS suppression signal and generates a modified SBS suppression signal at the output 136. In one embodiment, the modified SBS suppression signal includes a cancellation signal that reduces or substantially cancels amplitude modulation noise in the optical modulation signal that is caused by SBS suppression signal as described herein. The output of the signal processor 132 is applied to the input 318 of the EA diode 316.

The EA diode 316 is biased by the signal that is generated at the output 126 of the modulation bias power supply 128. The EA diode 316 modulates the optical signal that is generated by the laser diode 302 with the modified SBS suppression signal that is generated by the signal processor 132 and with the modulation payload signal that is generated by the modulation signal generator 122. The EA diode 316 generates a payload modulation signal at an output 320.

The payload modulation signal has SBS suppression resulting from the increased line width produced by the SBS suppression signal. The payload modulation signal also has reduced AM noise because the optical signal is modulated by the modified SBS suppression signal. However, the payload modulation signal has a somewhat lower signal-to-noise ratio compared with the payload modulation signal that is generated by the transmitter subassembly 300 of FIG. 3 because some of the modulation depth of the EA diode 316 is used to modulate the modified SBS suppression signal.

Figure 5:
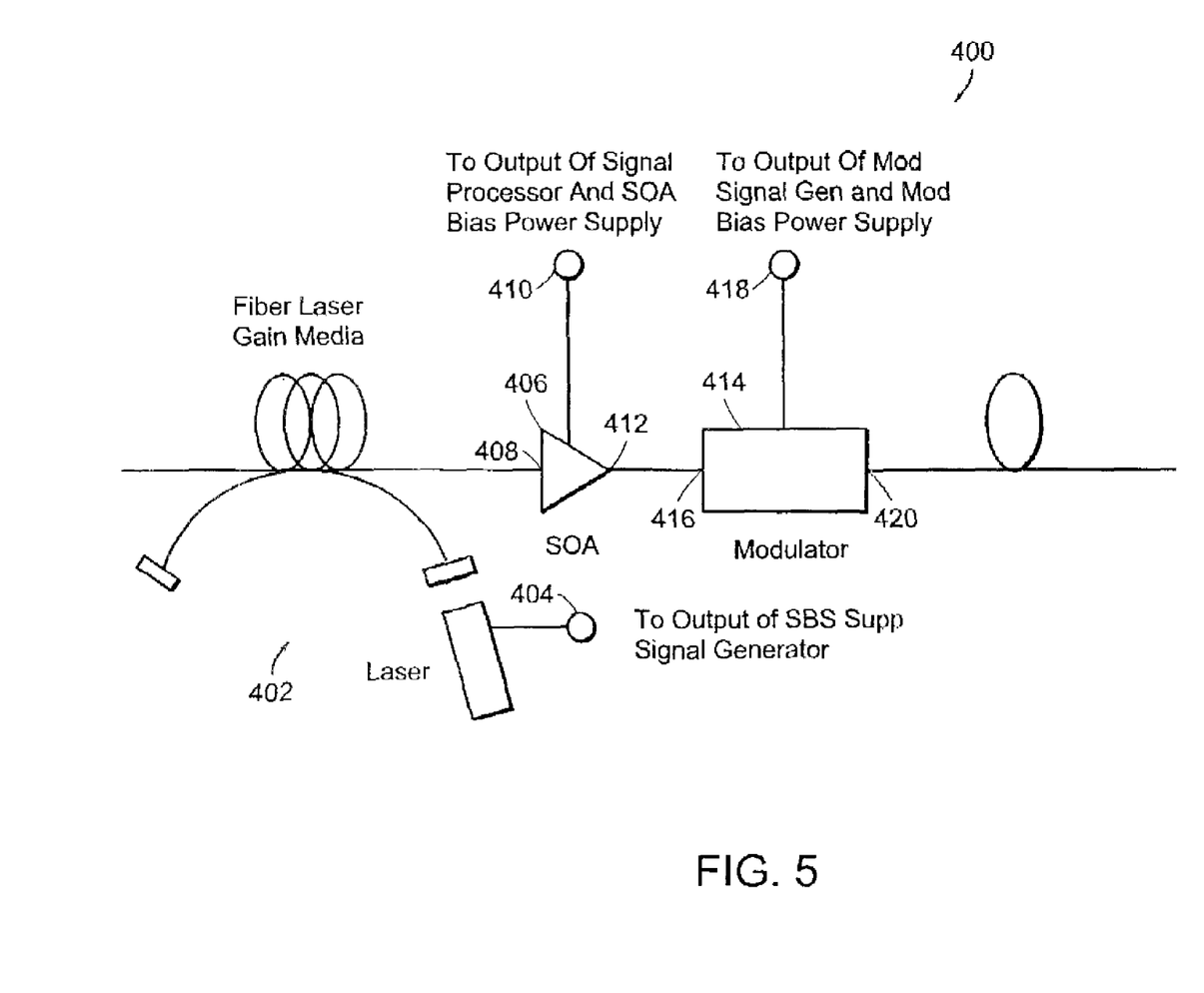
FIG. 5 illustrates an embodiment of a fiber laser optical transmitter module that can be used to generate an optical signal with SBS suppression according to the present invention.

FIG. 5 illustrates an exemplary embodiment of a fiber laser optical transmitter subassembly 400 that can be used to generate an optical signal with SBS suppression according to the present invention. The transmitter subassembly 400 is similar to the transmitter subassembly 300 that was described in connection with FIG. 3. However, the transmitter subassembly 400 includes a fiber laser 402. There are numerous types of fiber lasers that are well known in the art. Although a Fabry Perot-type fiber laser is shown in FIG. 5, any type of fiber laser can be used with the transmitter subassembly 400 of the present invention.

Referring to FIG. 1 and FIG. 5, the fiber laser 402 includes a modulation input 404 that is electrically coupled to the output 114 of the SBS suppression signal generator 112. A laser bias power supply (not shown) generates a laser bias signal that is used to bias the fiber laser 402 at an operating point that causes the fiber laser 402 to generate an optical signal having the desired wavelength and power level.

The transmitter module 400 also includes a discrete SOA 406, such as a Fabry Perot or traveling wave semiconductor amplifier. An optical input 408 of the SOA 406 is optically coupled to the output of the fiber laser 402. An electrical input 410 of the SOA 406 is electrically coupled to the output 136 of the signal processor 132 and the output of an SOA bias power (not shown in FIG. 1) that is used to bias the SOA 406 at the desired operating point. The SOA 406 is an in-line optical amplifier that generates an optical signal at an output 412 that is gain modulated by the SBS suppression signal.

The transmitter module 400 also includes an electro-optic modulator 414. Any type of electro-optic modulator can be used in the transmitter module 400. For example, in one embodiment, the modulator 414 is an electro-absorption modulator. In another embodiment, the modulator 414 is a Mach-Zehnder interferometric modulator. The output 412 of the SOA 406 is optically coupled to an input 416 of the optical modulator 414. An input 418 of the modulator 414 is electrically coupled to the output 124 of the modulation signal generator 122 and to the output 126 of the modulation bias power supply 128.

The operation of the transmitter module 400 is similar to the operation of the transmitter subassembly 300 that was described in connection with FIG. 3. Referring to FIG. 1 and FIG. 5, the fiber laser 402 generates an optical signal with the desired wavelength and power level. The SBS suppression signal generator 112 generates a SBS suppression signal. The SBS suppression signal is then applied to the modulation input 404 of the fiber laser 402. The SBS suppression signal increases the bandwidth of the optical signal.

The signal processor 132 processes the SBS suppression signal and generates a modified SBS suppression signal at the output 136. In one embodiment, the modified SBS suppression signal includes a cancellation signal that reduces or substantially cancels AM noise in the optical modulation signal that is caused by SBS suppression signal as described herein.

The output 136 of the signal processor 132 is applied to the input 410 of the SOA 406. A SOA bias power supply (not shown) generates a bias signal that biases the SOA 406 at an operating point that produces the desired gain modulation. The bias signal is applied to the input 410 of the SOA 406. The SOA 406 generates an amplified optical signal at the output 412 that is gain modulated by the modified SBS suppression signal.

The modulator 414 is biased by the signal that is generated at the output 126 of the modulation bias power supply 128. The modulator 414 modulates the amplified optical signal that is gain modulated by the modified SBS suppression signal with the modulation payload signal that is generated by the modulation signal generator 122. The modulator 414 generates a payload modulation signal at an output 420. The payload modulation signal has SBS suppression resulting from the increased line width produced by the SBS suppression signal. The payload modulation signal also has reduced AM noise because the optical signal is modulated by the modified SBS suppression signal.

FIG. 6 illustrates a 500 kHz span of a frequency spectra 450 generated by a commercially available CATV receiver that received an optical signal that was generated by an optical transmitter according to the present invention without SBS suppression compensation. Referring to FIG. 1 and FIG. 3, the SBS suppression signal generator 112 generated the SBS suppression signal from amplified filtered noise produced by a 50 kHz noise source. The SBS suppression signal was applied to the laser 302. The modulation signal generator 122 generated a single 300 MHz carrier tone modulation signal and applied the modulation signal to the EA diode 316. However, the signal processor 132 was not activated and did not apply a modified SBS suppression signal to the SOA 310. Therefore, the SBS suppression was not active in the transmitter.

The optical power of the received signal was about −1 dBm. The frequency spectra 450 illustrated in FIG. 6 shows AM noise as amplitude modulated sidebands. Specifically, the 50 kHz noise signal is clearly visible more than 10 dB above the noise floor on either side of the carrier for the illustrated 500 kHz span. FIG. 7 illustrates the ability to suppress the AM noise caused by the SBS suppression signal in the optical signal.

FIG. 7 illustrates a 500 kHz span of a frequency spectra 500 generated by a commercially available CATV receiver that received an optical signal that was generated by an optical transmitter according to the present invention with SBS suppression compensation. The optical transmitter that generated the optical signal was identical to the transmitter that generated the optical signal described in connection with FIG. 6, but the signal processor was active in the transmitter. Therefore, the SBS suppression compensation was active in the transmitter.

Referring to FIG. 1 and FIG. 3, the SBS suppression signal generator 112 generated the SBS suppression signal from amplified filtered noise produced by a 50 kHz noise source with the same level of noise used to generate the SBS suppression signal that was described in connection with FIG. 6. The SBS suppression signal was applied to the laser 302. The modulation signal generator 122 generated a single 300 MHz carrier tone modulation signal and applied the modulation signal to the EA diode 316. The signal processor 132 was activated so as to apply a modified SBS suppression signal to the SOA 310. Therefore, the SBS suppression was activated in the transmitter.

The optical power of the received signal was about −1 dBm. The frequency spectra 500 illustrated in FIG. 7 illustrates the same 300 MHz carrier with the same level of noise. However, applying the modified SBS suppression signal to the SOA 310 substantially eliminated the AM noise.

EQUIVALENTS

While the invention has been particularly shown and described with reference to specific preferred embodiments, it should be understood by those skilled in the art that various changes in form and detail may be made therein without departing from the spirit and scope of the invention as defined herein.

What is claimed is:

1. An optical transmitter having SBS suppression, the optical transmitter comprising:
    a) a signal generator that generates a SBS suppression signal at an output;
    b) a laser having an electrical input that is electrically coupled to the output of the signal generator, the laser generating an optical signal at an output having a line width that is broadened by the SBS suppression signal;
    c) a signal processor having an electrical input that is electrically coupled to the output of the signal generator, the signal processor generating a modified SBS suppression signal at an output; and
    d) a modulator that is optically coupled to the output of the laser and that is electrically coupled to the output of the signal processor, the modulator modulating the optical signal with a payload modulation signal and with the modified SBS suppression signal, thereby generating a payload modulated optical signal having SBS suppression that is determined by the modified SBS suppression signal.

2. The transmitter of claim 1 wherein the signal generator comprises a noise source that generates a noise signal that broadens the line width of the optical signal.

3. The transmitter of claim 1 wherein the signal generator comprises a pseudorandom sequence source that generates a pseudorandom sequence that broadens the line width of the optical signal.

4. The transmitter of claim 1 wherein the signal generator comprises a coherent signal source that generates a coherent signal that broadens the line width of the optical signal.

5. The transmitter of claim 1 wherein the signal generator comprises a modulator that generates a modulation signal that broadens the line width of the optical signal.

6. The transmitter of claim 1 wherein the signal generator comprises a filter that limits the bandwidth of the SBS suppression signal.

7. The transmitter of claim 1 wherein the signal processor shifts a phase of the SBS suppression signal.

8. The transmitter of claim 1 wherein the signal processor changes an amplitude of the SBS suppression signal.

9. The transmitter of claim 1 wherein the modulator comprises an amplifier that gain modulates the optical signal.

10. A method of generating a modulated optical signal having SBS suppression, the method comprising:
    a) generating a SBS suppression signal;
    b) modulating an optical signal with the SBS suppression signal, thereby generating a line width broadened optical signal;
    c) generating a modified SBS suppression signal from the SBS suppression signal; and
    d) modulating the line width broadened optical signal with a payload modulation signal and with the modified SBS suppression signal, thereby generating a payload modulated optical signal having SBS suppression determined by the modified SBS suppression signal.

11. The method of claim 10 wherein the generating the SBS suppression signal comprises generating a noise signal that broadens the line width of the optical signal.

12. The method of claim 10 wherein the generating the SBS suppression signal comprises generating a pseudorandom sequence that broadens the line width of the optical signal.

13. The method of claim 10 wherein the generating the SBS suppression signal comprises generating at least one coherent signal that broadens the line width of the optical signal.

14. The method of claim 10 wherein the generating the SBS suppression signal comprises modulating a signal that broadens the line width of the optical signal.

15. The method of claim 10 wherein the generating the SBS suppression signal comprises generating a SBS suppression signal that has a signal bandwidth that is within the payload modulation signal bandwidth.

16. The method of claim 10 wherein the generating the SBS suppression signal comprises generating a SBS suppression signal that has a signal bandwidth that is outside the payload bandwidth.

17. The method of claim 10 wherein the generating the modified SBS suppression signal comprises shifting a phase of the SBS suppression signal.

18. The method of claim 10 wherein the generating the modified SBS suppression signal comprises inverting the SBS suppression signal.

19. The method of claim 10 wherein the generating the modified SBS suppression signal comprises changing an amplitude of the SBS suppression signal.

20. An optical transmitter comprising:
a) means for generating a SBS suppression signal;
b) means for modulating an optical signal with the SBS suppression signal, thereby generating a line width broadened optical signal;
c) means for generating a modified SBS suppression signal from the SBS suppression signal; and
d) means for modulating the line width broadened optical signal with a payload modulation signal and with the modified SBS suppression signal, thereby generating a payload modulated optical signal having SBS suppression, wherein the modified SBS suppression signal reduces AM noise in the payload modulated optical signal.

\* \* \* \* \*